US009022198B2

(12) United States Patent
Lykkegaard et al.

(10) Patent No.: US 9,022,198 B2
(45) Date of Patent: May 5, 2015

(54) SERVICE CART

(75) Inventors: Uffe Lykkegaard, Århus C (DK); Lasse Lund Jensen, Århus C (DK); Søren Friis Autzen, Ry (DK); Carl Christian Vad Knudsen, Hinnerup (DK)

(73) Assignee: Crisplant A/S, Arhus N (DK)

( * ) Notice: Subject to any disclaimer, the term of this patent is extended or adjusted under 35 U.S.C. 154(b) by 102 days.

(21) Appl. No.: 13/641,785

(22) PCT Filed: Apr. 28, 2010

(86) PCT No.: PCT/DK2010/050096
§ 371 (c)(1),
(2), (4) Date: Dec. 7, 2012

(87) PCT Pub. No.: WO2011/134466
PCT Pub. Date: Nov. 3, 2011

(65) Prior Publication Data
US 2013/0126297 A1  May 23, 2013

(51) Int. Cl.
*B61D 15/08* (2006.01)
*B65G 17/12* (2006.01)
*B25H 5/00* (2006.01)

(52) U.S. Cl.
CPC . *B65G 17/12* (2013.01); *B25H 5/00* (2013.01)

(58) Field of Classification Search
CPC ........ B61D 15/08; B61D 15/12; B61D 15/00; B61B 12/00
USPC ...................................................... 280/32.6
See application file for complete search history.

(56) References Cited

U.S. PATENT DOCUMENTS

| 2,487,706 | A | * | 11/1949 | Happ | 280/32.6 |
| 5,070,794 | A | * | 12/1991 | Kunst et al. | 105/436 |
| 5,370,081 | A | * | 12/1994 | Gordon | 119/265 |
| 6,349,653 | B1 | * | 2/2002 | Siedlarczyk | 104/279 |
| 7,743,710 | B2 | * | 6/2010 | Gordon | 104/53 |
| 8,453,577 | B2 | * | 6/2013 | Gordon | 104/53 |
| 8,573,607 | B2 | * | 11/2013 | Meacham et al. | 280/32.6 |
| 2005/0051048 | A1 | * | 3/2005 | Broek | 104/106 |
| 2007/0030349 | A1 | * | 2/2007 | Riley | 348/143 |
| 2011/0227303 | A1 | * | 9/2011 | Gering | 280/32.6 |

FOREIGN PATENT DOCUMENTS

DE    10 2009 049 452 A1    4/2011

* cited by examiner

*Primary Examiner* — Gene Crawford
*Assistant Examiner* — Thomas Randazzo
(74) *Attorney, Agent, or Firm* — Knobbe Martens Olson & Bear LLP

(57) ABSTRACT

A device 202 for servicing and/or inspection of a material handling system 204 is disclosed, which device provides safer, less time consuming and less difficult service and/or inspection of the material handling system 204 than other devices. The device 202 is adapted to be moved along a track 214 of the material handling system and adapted for servicing and/or inspection of the material handling system or components thereof positioned on or adjacent to the track 214. The device includes at least one section, such as a hatch and/or a sliding bearing surface 216, 602, 706, 708, 710, 902, 1002, displaceable between a first and a second position, where the section positioned in the second position is enabling a person of accessing parts of the material handling system which are moving relatively to the device during movement of the device or during operation of the material handling system.

28 Claims, 10 Drawing Sheets

SERVICE CART

CROSS REFERENCE TO RELATED APPLICATIONS

This application is a U.S. National Phase Application of PCT International Application Number PCT/DK2010/050096, filed on Apr. 28, 2010, designating the United States of America and published in the English language. The disclosures of the above-referenced applications are hereby expressly incorporated by reference in their entireties.

FIELD OF THE INVENTION

The invention relates to servicing of a material handling system, and in particular to a service device and a method of servicing the material handling system.

BACKGROUND OF THE INVENTION

A material handling system is a system in which materials are handled by transporting them in accordance with a determined destination and which may comprise sorting such materials in accordance with such destinations. It is to be understood that the materials handled in the examples herein are items such as postal parcels or airport baggage and similar goods of various sizes and shapes.

These materials are transported on the material handling system, such as on a tilt tray of a tilt tray sorter where tiltable trays are comprised in a closed loop sorter with a closed loop chain running in a track for handling the materials. Alternatively the materials are as an example moved on totes, such as totes moved by a driven belt or a roller in various other types of material handling systems. Still further the materials may be moved by a force for moving the materials being applied directly to a surface of the materials.

The choice of material handling system type or a choice of a combination of several of the mentioned types or other similar non-mentioned types is dependent on the types of material to be handled, their size, weight etc as well as the material handling capacity needed at a given material handling site.

There are numerous types of sites with material handling systems of the mentioned types, and particular examples are postal package hubs, mail order distribution centres and airports.

Independent of the type of site or the type(s) of material handling equipment and systems used, the material handling systems usually require at least some preventive maintenance. In some cases components also need to be exchanged immediately due to sudden unforeseen work load or many years of extensive use and thereby many years of wear and tear.

Some material handling systems in sites such as postal hubs and airports may include several hundred meters or even several kilometers of tracks of material handling lines, such as transportation lines or materials handling lines or loops for sorting of the materials according to their destination.

Thus, servicing such systems and assuring the availability of such systems, which may be used for material handling 20 hours or more per day, more or less every day of the year may require several persons for carrying out service tasks, such as inspection of the systems, carrying out preventive maintenance or exchanging worn out components.

Still further and at some critical periods of the day, even a minimum of unavailability of the systems may incur flights getting postponed etc, or parcels not reaching their destination on time, it is of outmost importance that the systems have the optimum availability and therefore if maintenance must be carried out at a certain moment or breakage should occur, that the systems are maintained or repaired as swift possible.

The known devices and methods used for servicing such material handling systems are quite simple and include a service person walking on site and performing inspection, preventive maintenance, maintenance or repair with various hand tools which are brought to a service location where service is to be provided.

The service person usually performs the service task to be performed, e.g. by climbing a ladder to get near the material handling track and/or components thereof and while being on this ladder, or while being positioned on other at least partly suitable similar types of equipment.

An example of a type of preventive maintenance which is likely to be performed is cleaning of components of one or more tracks or components comprised in or on or adjacent to the track, e.g. by cleaning them with a vacuum cleaner. Often, preventive maintenance also includes visual inspection of the systems and components thereof.

Material handling tracks are often provided at an elevated height above ground level in a building in which the tracks are present. In this way access can be provided underneath the tracks for other material handling tracks, personnel, trucks, or similar powered or unpowered, manned or unmanned vehicles.

The tracks may be difficult to access due to platforms for support of various types of equipment, or due to destinations lines, called chutes, or other types of equipment, which, seen from a service point of view are obstacles, although important and typical in material handling sites.

Thus preventive maintenance, maintenance or repair or even simple inspection of material handling systems have proven difficult and time consuming.

Still further, in some cases the conditions on site, e.g. in combination with the enthusiasm of service personnel to keep the highest availability of the system, have been known to make it challenging, or even impossible, to carry out service or inspection tasks, with known devices and methods, while assuring a personnel safety which is satisfactory.

Alternatively, and as an example, maintenance or preventive maintenance is not carried out or not carried out often enough, in view of the maintenance schedules provided, due to the lack of safety in carrying out the maintenance or due to the hassle of carrying out service in a safe manner. As a possible consequence of this, a loss of availability occurs.

Thus, the inventors of the present invention have appreciated that an improved device for maintaining and method of maintaining a material handling system, i.e. servicing and/or providing inspection of the material handling system is of benefit, and have in consequence devised the present invention.

SUMMARY OF THE INVENTION

It may be seen as an object of the present invention to provide an improved device for servicing and/or inspection of a material handling system and an improved method of servicing and/or improved method of providing inspection of a material handling system.

Preferably, the invention alleviates, mitigates or eliminates one or more of the above or other disadvantages singly or in any combination.

Alternatively or additionally, it may be seen as an objective to provide a device and method for servicing and/or providing inspection of a material handling system with a precise positioning ability of the device at a location where service and/or inspection are/is required.

Still further and alternatively or additionally, it may be seen as an objective to provide a device and method for servicing and/or providing inspection of a material handling system with an expanded possibility of inspection and cleaning when compared to existing devices and methods.

In particular, though alternatively or additionally to the other possible objects described, it may be seen as an object of the invention to provide a device and a method for servicing and/or providing inspection of a material handling system while providing improved safety.

Accordingly there is provided, in accordance with an apparatus aspect of the invention, a device for servicing and/or inspection of a material handling system, where the device is adapted to be moved along a track of the material handling system and adapted for servicing and/or inspection of the material handling system or components thereof positioned on or adjacent to the track and adapted to be controlled via a user interface, and wherein the device comprises at least one displaceable section, such as a hatch and/or a sliding bearing surface, which is displaceable between a first and a second position on the device, where said section in the first position is preventing a person carried on the device from manually accessing an area of the material handling system with parts of the material handling system which are moving relatively to the device during movement of the device or during operation of the material handling system, and where said section positioned in the second position is enabling the person of accessing parts of the material handling system which are moving relatively to the device during movement of the device or during operation of the material handling system.

Thus an improved device for servicing and/or inspection of a material handling system is provided. Compared to known solutions, an improvement or advantage of the device, may lie therein that when adapting the device to be moved along the track of the material handling system, a possibility of carrying out service and/or inspection tasks, with less difficulty, which is less time consuming and more safe than known solutions is provided.

Still further, a possible advantage of the device may lie therein that when comprising at least one displaceable section in the device as described, a device providing an excellent personnel safety and excellent ergonomic conditions is provided when carrying out service or inspection tasks.

The at least one displaceable section of the device enables improved access to the material handling track, possibly including access which is otherwise prevented by one or more coverings. Hereby improved access to areas of the material handling system which are normally covered to prevent access or only accessible with difficulty due to their position alone, e.g. underneath the material handling track, is provided.

The improved access and ergonomic conditions may be provided by the at least one displaceable section, such as the hatch or the sliding bearing surface, being comprised in the device and in that the device is adapted for moving along the track. Still further the improved access may be provided in that the hatch, in at least some embodiments of the invention, is corresponding at least in position, to a covering which is normally covering access to the material handling track, such as a top covering of the material handling system.

The device may be adapted to be moved along a track of the material handling system by being adapted with a size to fit the track and conditions of the material handling system, such as by having a 'cart like' structure with a chassis and possibly also with sides. The device may be adapted for servicing of the track by comprising or having a space provided for one or more service tools, such as a vacuum cleaner, a spray bottle, hand tools etc.

The device is adapted to be controlled via a user interface. This user interface, wired or wireless, may be positioned or comprised or fixed in the device, or may e.g. be a handheld wireless user interface to be positioned and used in and from the device or may be a centralised user interface in a control room. The user interface is operable coupled to a control system for controlling the device.

When the device comprises means for enabling or disabling displacement of the at least one section and wherein the at least one section is only displaceable in response to one or more criteria being satisfied, a particularly safe embodiment of the invention is provided. In that displacing the at least one section provides for access to areas of the sorter comprising parts of the sorter which are moving relatively to the device when the sorter is moving, it has been found that one or more criteria for enabling displacement of the section improves safety of using the device.

An embodiment of the invention is provided when the at least one section and the device is adapted with sizes and said section is adapted with first and second positions, so as to enable a person to be transported along the track of the material handling system on the device while lying in a service posture on the device. The embodiment is describing one particular way of adapting the device in order to provide improved ergonomic conditions and safety for the service person.

Still further, when adapting the device to provide for such personnel posture on the device, an expanded possibility of inspection and cleaning of the material handling system is provided. The laying person may be facing upwards away from the bottom or chassis of the device, downwards towards the bottom or even sideways in a direction transverse to a moving direction of the device.

A surface on the device for carrying a person on the device, such as the sliding or a non-sliding bearing surface is preferably adapted so as to be as near the track of the material handling system to be serviced or inspected from the device as possible. A height of the bearing surface may be adjustable, such as to be adjacent a bottom of the device while servicing the track or components adjacent to the track, such as through one or more hatches at the bottom side of the device.

Similarly the bearing surface may be provided or adjustably raised to a height, of e.g. 300 or 400 mm. above a bottom of the device, while or if e.g. servicing or providing manual inspection of a material handling track through one or more hatches at a top side of the device. In such case the device may comprise an at least partly closed space, such as a transparent caging, where safety exit e.g. is substantially a complete rear side of the device which is left open. A height of such caging is preferably fitted to be the maximum free height in the material handling system, in which system the device is comprised or incorporated or where the device is to be comprised.

In order to improve personnel safety when using the device, the device may comprise connecting means for connecting safety equipment, such as a rope, to the device for escaping from the device from an elevated height of the device.

In accordance with embodiments of the invention the user interface is fixed in the device, for inputting control requests for controlling the device or the user interface is provided as a handheld wireless user interface which is to be positioned in the device, for inputting control requests for controlling the device. Furthermore, for such embodiments, a device is provided which is precisely controllable from the device. Alternatively, such as in a situation where the device at least in the situation is unmanned and e.g. provided with one or more cameras, a handheld wireless user interface or a centralised user interface in a control room, may be operated e.g. in order to move the unmanned device to a certain location and acquire one or more pictures at that location and/or to perform an automated service task.

When the device comprises wireless transmission means, coupled to the user interface, and the device and the wireless transmission means are adapted for sending wireless control signals for starting or stopping or adjustment of transportation speed of the device from the device to the control system and thus for power means to enable starting, stopping or adjustment of the transportation speed, a way of communicating is provided with a centralised control system, which centralised control system is usually provided apart from the track and the device. In that a control request can be inputted to the user interface, such as a touch screen, and in that such requests are immediately sent to the control system and carried out, e.g. an easy and precise positioning of the device along the track can be provided. Thus the material handling system can at least partially be controlled from the device. Still further and also in order to assure safe operation of the device, the device is hereby enabled to be precisely operated by a single person from the device.

When the device is operable coupled to the control system which is operable coupled to a power means for providing power for transporting the device along the track an embodiment of the invention disclosing a way of controlling the device is provided. Control may follow using wireless transmission of control signals.

When the device is adapted for obtaining signals corresponding to a transportation speed of the device a criteria for displacing the at least one section in response the transportation speed can be set. The transportation speed may also be simplified, e.g. just to include 'moving (1) or stopped (0)'.

A criterion for enabling the at least one section, such as a hatch or a sliding bearing surface, to be displaced from the first to the second position, can be that a transportation speed of the device is zero or substantially zero, and thus in this example only allowing for servicing through an opened hatch or from a sliding bearing surface in its second position, when the device is ideally completely stopped.

When the device is comprised in a driving chain of a material handling system, a possible way of providing very swift service at any position at or adjacent to the material handling system is provided.

When the device is adapted for attachment to or incorporation in a driving chain of a material handling system such as a closed loop tilt tray sorter or closed loop cross belt sorter, a particular embodiment of the invention is provided. At some sites it may be unwanted to move the device along the material handling track at all times, and thus the device in accordance with the present invention can easily be attached or incorporated in e.g. a driving chain of a material handling system.

This may e.g. be due to a light weight construction of the device, where the device e.g. may be provided in a number of units, each with a predetermined maximum weight of e.g. 20 kg., and where each unit e.g. comprises handles for carrying the unit. Still further the device may comprise attachment means such as connectors or comprise a certain shape for easily attachment of the device or units thereof to the material handling system.

Each unit of the device can be attached to the material handling system, such as to a cart of a tilt tray or cross belt sorter, in order for the one of more units of the device to be moveable with or comprised as one or more transport unit(s) or cart(s) of the material handling system. In a tilt tray or cross belt system, such carts are comprised in a chain of the sorter loop, which chain is moveable in or on the track of the system.

A unit may comprise one or more hatches and the user interface, another unit or other units may at least partially comprise a surface for carrying a person, while a still further unit may comprise service tools such as a vacuum cleaner and/or an on board power supply for powering and enabling movement of the device and/or for powering service equipment and/or for powering the user interface and/or for powering wireless transmission means. The on board power supply may be a battery and/or e.g. a system for inductive power transfer to the device.

Herein, the service device or Service Cart may be extending over several carts of the material handling system as several units or extending over several carts as a single unit. Even in a tilt tray or a cross belt sorter, a single unit service device or single unit service cart may be preferred, which single unit cart or device is then e.g. only attached to a single cart of the sorter and may e.g. extend outwards from the track, e.g. when a moving direction of the sorter chain changes from straight to curved, such as in a 180 degrees horizontal curve of the sorter track.

In material handling systems where the device is incorporated in or to be incorporated in a driving chain of the material handling system, a power supply and driving means for providing movement of the device along the track, are not needed on board the device.

When the device is adapted for transportation along a track of a material handling system such as a material handling system adapted for transportation of items on driven belts or driven rollers, an embodiment of the invention is provided in which the device is not 'incorporated or attached' to the material handling system as such, but adapted for moving along such material handling system using means for providing such movement comprised in the material handling system and/or means for providing such movement comprised on board the device.

When the device furthermore comprises detection means, such as a camera, for detection of service tasks on or adjacent to the track of the material handling system, an unmanned device, which can be manned e.g. when service tasks have been detected by the camera or detected and determined by a centrally placed service person looking at the images from the camera. The images may or may not be moving pictures, e.g. 50 pictures per second taken while the device is travelling along the track but may as well be one or more single pictures acquired at predetermined positions of the track. A service task detected may comprise detection of a bag or other item which has fallen off into a net along the track of the material handling system. The service task to be performed is then to collect the bag or item and make sure it reaches its correct destination.

The one or more cameras may be positioned on one or more sides of the device such as at the front, rear, left, right, top or bottom side of the device, having substantially corresponding or opposite directions of detection.

The cameras may as an example be used to detect dust or other objects at positions where no objects or less dust used to be, or to detect objects in a condition or position which needs servicing. Alternatively or additionally, the cameras may be used to enable automatically service tasks to be performed, such as vacuum cleaning using images from a camera as inputs to a vision system.

Still further, one or more cameras may be used to detect presence of any bags or parcels, such as very slippery bags or the like, which may have fallen off transport units of the material handling system or small items which have found their way into the track of the material handling system and which is to be collected using the device for this task or not.

In accordance with the method aspect of the invention there is provided a method of servicing and/or providing inspection of a material handling system, the method comprising enabling movement of a device comprising at least one section along a track of the material handling system, servicing and/or providing inspection of the material handling system or components thereof positioned on or adjacent to the track from the device, controlling operation of the device via a control system enabling control of the device, wherein the method further comprises inputting control signals to the control system in order to start, stop, adjust transportation speed or for initiating, stopping or controlling an automated servicing procedure as manually inputted requests or as automatically generated requests as automatically generated control signals and displacing said at least one section from a first to a second position on the device, where said section in the first position is preventing a person on the device from manually accessing an area of the material handling system with parts of the material handling system which are moving relatively to the device during movement of the device or during operation of the material handling system, and where said section positioned in the second position is enabling the person of accessing said parts, and carrying out manual service of the material handling system when said section is positioned in said second position.

Thus, an improved method of servicing and/or improved method of providing inspection of a material handling system is provided. The improvement may lie therein that when enabling movement of the device along the track of the material handling system an improved accessibility and ease of access to the material handling system is provided compared to known methods.

Still further the improvement may additionally or alternatively lie therein that when inputting control signals to the control system as described and servicing and/or carrying out inspection of the material handling system when the at least one section is displaced to the second position, a precise positioning of the device and positioning of the service person for carrying out dedicated service is provided in a way with excellent safety and ergonomic conditions.

The manually inputted control signals may be requested from the device by a person present on the device or may, e.g. in an unmanned situation of the device be requested manually via a user interface positioned apart from the device, such as a person present on the ground just below the device.

When the automatically generated control signals are provided in response to detections provided by one or more detection systems, such as one or more cameras, provided on board the device, at least an unmanned inspection of the material handling system can be provided. Additionally or alternatively, an automatic detection or inspection system may allow for automated service tasks to be performed, such as to dust of or vacuum clean at certain positions along the track where dust is detected, possibly while human service personnel is handling other service tasks.

The automated service task may even be performed while the device is moved at or near normal material handling or travelling speed and preferably, at least when running e.g. at maximum speed of the material handling system, while the device is unmanned.

In general a material handling system is able to detect where a certain transport unit of the system is located along the track, and this may alternatively enable a service route to be provided with one or more locations along the track where manual service, repair and/or further manual or automated inspection or detection is needed. This may follow by correlating certain locations with certain manual or automated detections and in response generating the service driving route. The manual service at one or more locations of the service route may be carried out from the device or with known means, such as via a ladder placed on the ground under the material handling system at the given location.

In accordance with an embodiment of the method a person transported by the device is provided for carrying out manual service and/or for inputting control requests and/or for carrying out manual inspection or guiding automated inspection of the material handling system. In accordance with a preferred embodiment of the invention, the method may include stopping the transportation of the service device at a location along the track, and carrying out a manual or automated service procedure or inspection at or adjacent to said location. Alternatively or additionally, one or more locations can be stored and/or inputted, at which one or more locations the device is to be stopped along the track. The one or more locations may be set manually or automatically. This may be particularly advantageous when performance of service tasks are interrupted or a service operator is changed and knowledge of the last known service locations or one or more locations to be serviced must be found.

As elaborated elsewhere herein the at least one section, such as the hatch, may in accordance with embodiments of the invention only be displaced from a first to a second position when a transportation speed of the device is zero or substantially zero.

Particularly, with the device and the method of servicing and/or providing inspection of the material handling device according to the method aspect of the invention, it is possible to maintain a posture, such as a lying posture, of a person on the device, while the device is moved along the track of the material handling system to a new position which requires service and/or inspection and while carrying out service and/ or while carrying out inspection. This enables expanded possibility for servicing and/or inspection in a safe and ergonomically correct manner.

In consequence it is assured that the enthusiasm of service personnel to keep the highest availability of the system is kept in order, while assuring personnel safety and ergonomic conditions for the service personnel and/or an operator using the device which is excellent. Hereby maintenance or preventive maintenance is carried out as often as required in view of the maintenance schedules provided. This assures that a loss of availability of the material handling system does not occur.

In general the various aspects and advantages of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
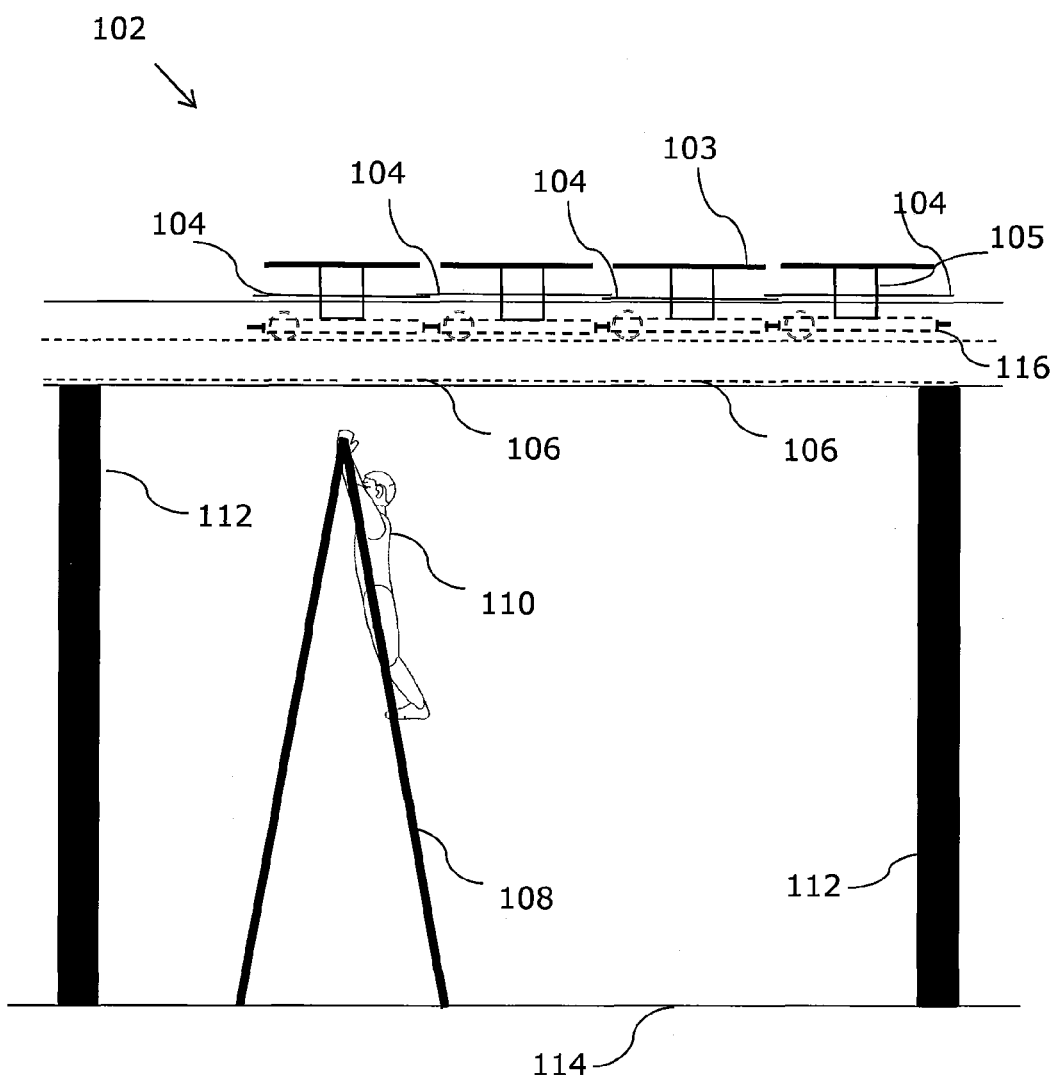
FIG. 1 is an illustration of a known material handling system with a known service device and a known method of servicing a track of a material handling system.

FIG. 1 is an illustration of a known material handling system 102 with a known service device 108 and a known method of servicing a track of a material handling system. The figure illustrates a climbing service person 110, climbing a ladder 108 in order to access and service a track of a tilt tray material handling system at a location along the track of the material handling system.

The figure also illustrates that the material handling system is supported on supports 112, e.g. at a distance of 4000 mm. in between the supports. The material handling system track illustrated may be positioned around 3500 mm above ground level 114.

The material handling equipment illustrated is a so called tilt tray sorter due to the tilt trays 103 and tilting supports 105, but may be any other alike material handling system such as a cross belt sorter. The primary differences between such sorters are known to a person skilled in the art.

It is illustrated that the track of the sorter is covered with top coverings 104, which in the example are each carried by the moving parts of the sorter, i.e. connected to the travelling carts 116 of the sorter chain. Still further, it is illustrated that the sorter track towards the bottom side of the sorter track is covered with bottom coverings 106, which in the shown example are fixed to the sorter track or sorter line. The climbing service person 110 is moving towards a position of the sorter track to be serviced and the first task to be carried out in the example is to remove one or more bottom coverings in order to clean an inside of the sorter track.

Figure 2:
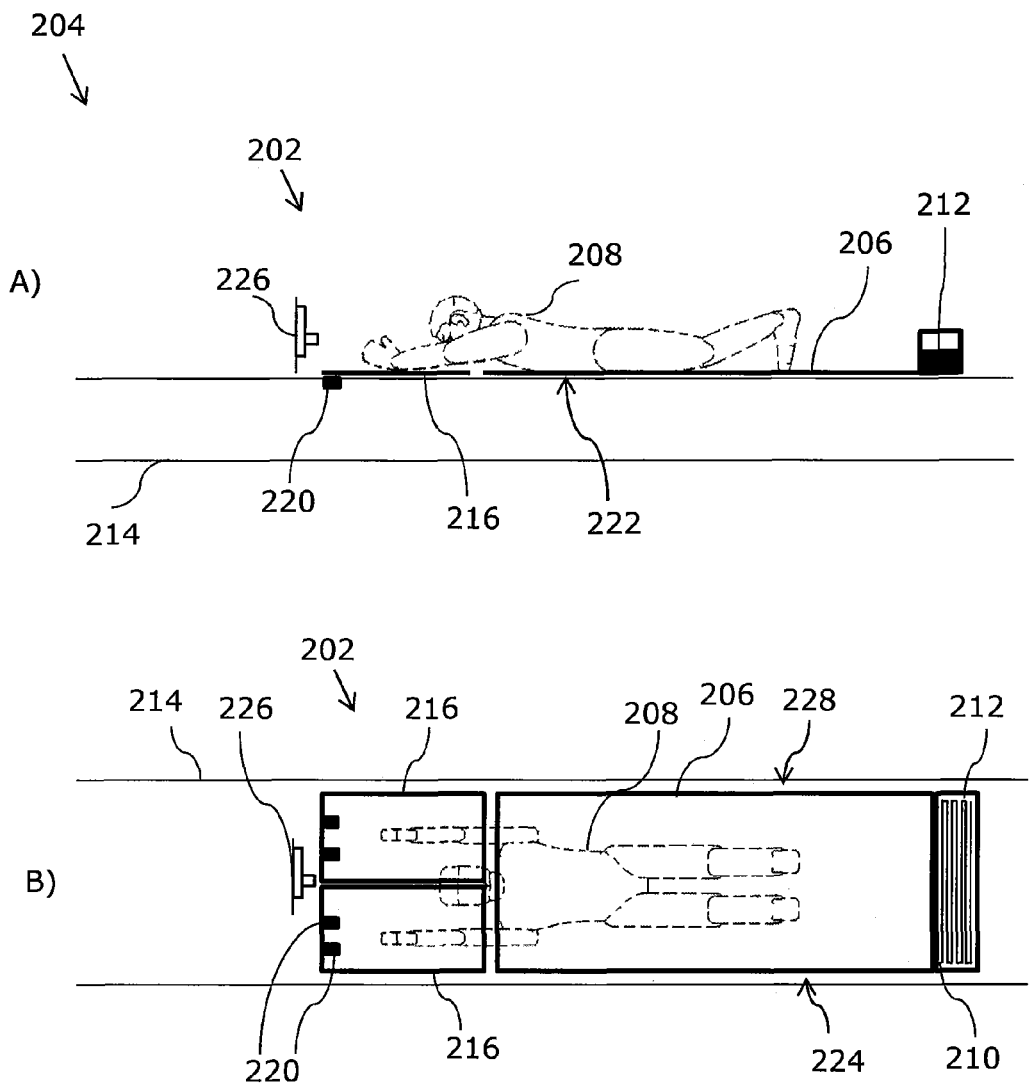
FIG. 2 is an illustration of an embodiment of the invention to be used in a material handling system, the embodiment including a hatch.

FIG. 2 illustrates an embodiment of the invention to be used in a material handling system 204. The embodiment is shown in a side view A) and a top view B). The shown device is suited for a) inspection, and/or b) preventive maintenance, and/or c) repair or exchange of components, and/or d) cleaning. Whereas the tasks, a), b) and d) can be carried out automatically, but may be carried out manually, whereas c) is preferably and most suitably carried out manually.

In the illustration there is pointed towards a right side 228, a left side 224 and a bottom side 222 of the device 202.

In particular the figure illustrates a device 202 for servicing and/or inspection of a material handling system 204.

The device includes a bearing surface 206 which is adapted for carrying a person 208, connecting means 210 for connecting safety equipment to the device, the safety equipment possibly comprising means for escaping from the device, such as rope 212 attached to the device for escaping from the device from an elevated position of the device.

The connecting means are not shown in details, but may in the example be embodied by a lug or loop or opening or threaded opening comprised on the device for connection and attachment of the rope or other similar safety means, to the device.

The device is adapted to be moved along a track 214 of the material handling system and adapted for servicing and/or inspection of the material handling system or components thereof positioned on or adjacent to the track 214.

The illustrated device further comprises a user interface 226 for inputting control requests for controlling the device, and at least one section, which is displaceable between a first and a second position on the device. In this embodiment, the at least one displaceable section is at least one hatch 216. The at least one hatch is adapted with a size and relative position to the bearing surface 206 so as to enable servicing and/or inspection of the material handling system through the hatch. In FIG. 2 the hatch is shown in its first position, in which first position the hatch is closed.

Figure 3:
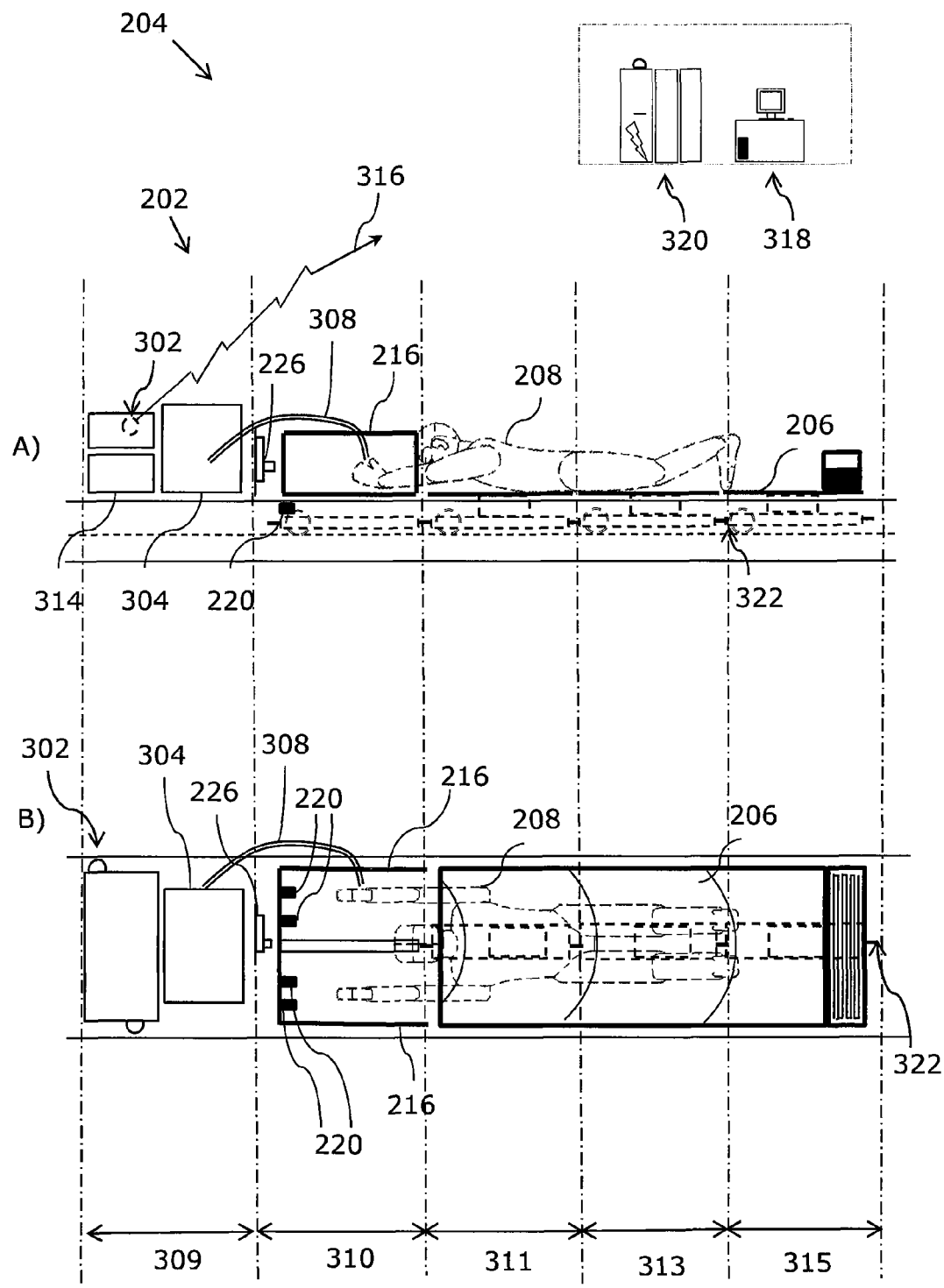
FIG. 3 is an illustration of an embodiment of the invention incorporated in a closed loop tilt tray sorter or closed loop cross belt sorter, the embodiment including a hatch.

Manual service, such as exchanging components etc through the hatch can be provided when the hatch is positioned in the second position in which the hatch is open and thus is enabling the person 208 of accessing parts of the material handling system which are moving relatively to the device during movement of the device or during operation of the material handling system. The second open position of the hatch is illustrated in FIG. 3.

The hatch 216 and the bearing surface 206 are adapted with sizes and relative positions so as to enable a person on the bearing surface in a given service situation, shown with dashed lines, to be transported along the track 214 of the material handling system while laying in a service posture on the bearing surface 206. In the illustrated example the bearing surface is fixed relatively to the chassis of the device, but may alternatively be provided as a sliding bearing surface.

In the shown example the device is upwardly open and adapted in width and length for a lying person. In this way the device is particularly useful in systems where a free height of the system is relatively low. Still further a safe and comfortable service and travelling posture can hereby be enabled.

Although not shown in the illustration the device may comprise fixed or detachable left, right and rear sides, e.g. with a height of 150-300 mm. and/or a metal frame preventing a head of an operator or service person 208 to be moved too high upwardly or from damage in case of any items falling from above and/or from items unintentionally being introduced in the system from above or from a left and/or right side of the device. Still further and not shown in the illustration of FIG. 2, but e.g. refer to FIG. 3, the device 202 may comprise service equipment or service tools such as a vacuum cleaner, power means etc.

As illustrated, the device 202 includes means 220 for enabling or disabling opening of the at least one hatch. The means 220 are comprised in an electronically stopping and safety system by which the sorter can not be started and thereby the device can not be moved, when the hatch is opened in the second position of the hatch. Similarly, the electronically stopping and safety system is provided so as to assure that the hatch can not be opened when the device is moving along the track 214. For full personnel safety, the system is single fault tolerant and as an example hereof, two means 220 are shown for each hatch. The means 220 may be mechanical or magnetic locking means or locks, which includes a detection of whether or not they are locked and thereby whether or not the one or more hatches 216 are opened or closed. A status of the locking and/or detection means 220 is used as input to the control system and as an example of a suitable and safe system, the at least one hatch 216 is only enabled for being opened, i.e. displaced to its second position, in response to one or more criteria, such as a stopped sorter, being satisfied.

An alternative in order to provide personnel safety when using the device is to provide a mechanical solution such as the following. The solution may also be in addition to the single fault tolerant electrical/electronically solution described.

A mechanical solution, to prevent fingers or similar to be caught in moving parts of the material handling system and/or in parts of the material handling system which are moving relatively to the device during operation of the material handling system, and which may by used as an alternative or in addition to the single fault tolerant electrical/electronically solution described and for the same purpose, is to provide a mechanical locking solution to moving parts in the material handling system, such as the sorter chain, before the service hatch can be displaced to the second position and thus opened. This may be embodied by a brake for assuring stoppage of the sorter chain or the service device, while service is carried out, such as that a criterion for opening the hatch is that the sorter is stopped by the brake and prevented from moving by the brake before the hatch can be opened and thus before the hatch can be displaced to its second position.

The device 202 is a swift and ideal solution for inspecting, cleaning and performing a number of standard service tasks on material handling systems 204 including sorting machines. The device provides the possibility of a service person 208 travelling along a track 214 of a material handling system, such as a closed tilt tray or cross belt sorter loop, for trouble-free and safe access to confined spaces where service otherwise can be difficult to perform due to coverings, platforms, chutes, support pillars 112 etc.

Easy access is essential for the person 208 when performing both inspection and cleaning. When mounted and circling on a closed sorter loop, such as a tilt tray or cross belt sorter loop, the device 202 or 'Service Cart' 202, may be positioned on or in such material handling systems 204 like any standard cart of such sorter, thereby providing the operator with a good overview of the working area.

The device is preferably constructed using a light weight design that makes it easy to mount on or in the material handling system 204, hereby providing easy and safe access to the entire material handling system 204.

The device can either stay permanently fitted to the sorter, such as connected to and/or incorporated in a chain 322, see FIG. 3, of the sorter and/or connected to carts 116, see FIG. 1, comprised in the chain and/or even be attached to item handling trays 103, see FIG. 1 for the tray, of a tilt tray sorter or to a cross belt of a cross belt sorter, or be manually mantled and dismantled when needed.

Still further, especially in the example of equipping a cross belt sorter with the device, it is a possibility to let the surface of one or more cross belts form the bearing surface or at least partially form the bearing surface for the service person. In such example an elected cross belt, possibly along with a support for the cross belt, e.g. in front of a bearing surface at least partly formed by one or more belts of cross belts, may be dismantled along with any covers 104, see FIG. 1, normally covering the sorter track 214 at the elected cross belt, and the hatch 216 of the device 202 inserted at the position of the dismantled cross belt.

A reason that a cross belt sorter is particularly suitable for such alternative design, is that such alternative bearing surface, at least partly formed by the surface of the cross belts, are positioned at a level just adjacent to and just above the sorter track 214 for easier access to the sorter track, e.g. in comparison with trays 103 of a tilt tray sorter, which trays, due to the tilting movement and tilting support of the tray, are normally positioned somewhat higher above the sorter track than the belts of a cross belt sorter.

In consequence and for a material handling system such as the tilt tray sorter, it is preferred to dismantle the tilt trays 103, along with the support for supporting and tilting the tilt tray—the so called tilting device 105, and insert special one or more dedicated units comprising a bearing surface and a hatch just adjacent to the sorter track below. The number of units, 309, 310, 311, 313, 315, see FIG. 3, of the sorter which is used for the device is among others dependent on a cart to cart pitch of the sorter, a curve radius of the sorter and/or the amount of equipment or space needed on the device 202.

In any of the alternatives it is preferred to dismantle at least one tilt tray or cross belt unit attached to the sorter chain, including any top coverings, in order for a person on the device also to gain access to an area which is normally not accessible and with parts of the material handling system which are moving relatively to the device during operation of the material handling system.

For a material handling system 204, such as tilt tray or cross belt sorter, at least one unit may comprise the device, but alternatively and as an example, two or more dedicated units can be provided, such as one unit comprising one or more hatches and one unit being a dedicated unit at least partially comprising a bearing surface for a person or operator. In an example where the device comprises a hatch towards a side of the material handling system, a single unit system with a length of e.g. 1200 mm. and a width of e.g. 600 mm. may be sufficient. Thus, in some sorting systems and for some solutions only a device provided as a single unit may be needed.

In an example where one sorter or material handling system 204 is positioned just above another or where two sorters are crossing each other at certain positions, and service and/or inspection of e.g. an uppermost of the two such sorters or material handling systems is needed from below, a bearing surface somewhat elevated from a lowermost sorter track of the lowermost sorter can be preferred.

A bearing surface, such as a tilt tray or similar bearing surface fitted with an increased height, or even with an adjustable height, above the sorter chain can be preferred. In such cases, a person travelling on the track of the material handling system would preferably be lying on the back with a face facing away from the bearing surface, towards a material handling system crossing or running just above.

In systems where alternative and more or less non-dedicated bearing surfaces are used, such as tilt trays or cross belts as discussed, attachable sides and/or attachable soft tissues for increasing safety and comfort, respectively, may be attached to the non-dedicated bearing surfaces in order to dedicate their purpose somewhat to be used as a bearing surface for carrying a service person 208 in or on a device 202.

In the embodiments described in FIGS. 4 and 5 hereinafter where the material handling system 204 on which the device 202 is to be used is adapted for transportation of items on driven belts or driven rollers, the device is a single separate unit which may be driven by belts or driven rollers. Alternatively the device is provided with driving means etc on board, in material systems where such configuration is able to provide movement of the device and where this can be preferred in comparison with providing and controlling the movement of the device by controlling the driven belts and rollers.

The construction and the special design of the device ensure that the service person or operator is safely positioned in an ergonomically correct working posture. For safety the device comprises safety equipment and features a number of safety features to ensure optimal security during operation along with a possibility to exit the cart in the un-likely event that an emergency situation should arise.

Safety aspects may comprise one or more of the following examples; falling down from an elevated height of the device, getting a finger or arm or limb caught in the material handling system or being prevented from exiting the device fast and safe enough, e.g. in an emergency situation.

FIG. 3 is an illustration of an embodiment of the invention incorporated in a closed loop tilt tray or closed loop cross belt sorter. The embodiment is shown in a side view A) and a top view B).

In particular the figure illustrates the device 202 which is coupled to the control system 318, which control system is coupled to a power means 320 for providing power for transporting the device 202 along the track 214 of the material handling system 204. The device comprises wireless transmission means 302, such as an antenna for a WLAN or similar system, and the device and the wireless transmission means are at least adapted for sending wireless control signals 316 for starting or stopping or adjustment of transportation speed of the device 202, from the device 202, to the control system 318. Thus, for the power means 320 to enable starting, stopping or adjustment of the transportation speed of the device 202.

As illustrated, the device 202 is incorporated in the material handling system 204 and is comprised in a driving chain 322 of a material handling system 204.

As illustrated, the device includes the user interface 226 for manually inputting control request for starting, stopping or adjustment of the transportation speed of the device 202. The user interface may additionally be used to control service equipment such as a vacuum cleaner with a hose 308 provided on board the device 202. Alternatively or additionally the vacuum cleaner is equipped with one or more additional ducts, not shown, for providing vacuum cleaning at one or more automatically or manually electable and/or automatically controllable areas.

As illustrated the device includes a power source 314 for powering service equipment, in this example especially the vacuum cleaner 304 and for powering the user interface and the wireless transmission means. The on board power supply may be a battery and/or e.g. an inductive power transfer system for transferring power to the device.

As illustrated the device is in the embodiment provided in five lightweight units 309, 310, 311, 313 and 315. Each unit of the device 202 is attached to a cart of the sorter, in order for the units to be moveable with the sorter chain 322.

In the example a front most unit 309 comprises the power source 314, the transmission means and the vacuum cleaner 304. A second, following, unit 310 comprises the user interface 226 and at least one section, in this embodiment two hatches 216, which are each displaceable between the first and the second position on the device.

A third 311 and a fourth unit 313 may, as illustrated, at least partially comprise the bearing surface 206, whereas the fifth unit 315 also comprises safety equipment. In the illustration a unit to unit pitch is approximately 600 mm.

No physical front, left or right sides are illustrated, but such sides, e.g. of a height of 200-500 mm. are preferred. Preferably the sides may be of a foldable and/detachable type which can be folded down or detached when the device is not in use. The one or more hatches 216 may be transparent such as comprising a transparent synthetic material.

In the system illustrated in FIG. 3, the device is incorporated in the driving chain of the material handling system, and thus a power supply and driving means for providing movement of the device along the track, are not needed on board the device.

The device 202 is adapted with means, not shown, for obtaining signals corresponding to a transportation speed of the device. This may be as signals received from a central control system or as signals obtained from speed detection means onboard the device or from speed detection means onboard the chain 322 of carts in which the device is comprised.

Figure 4:
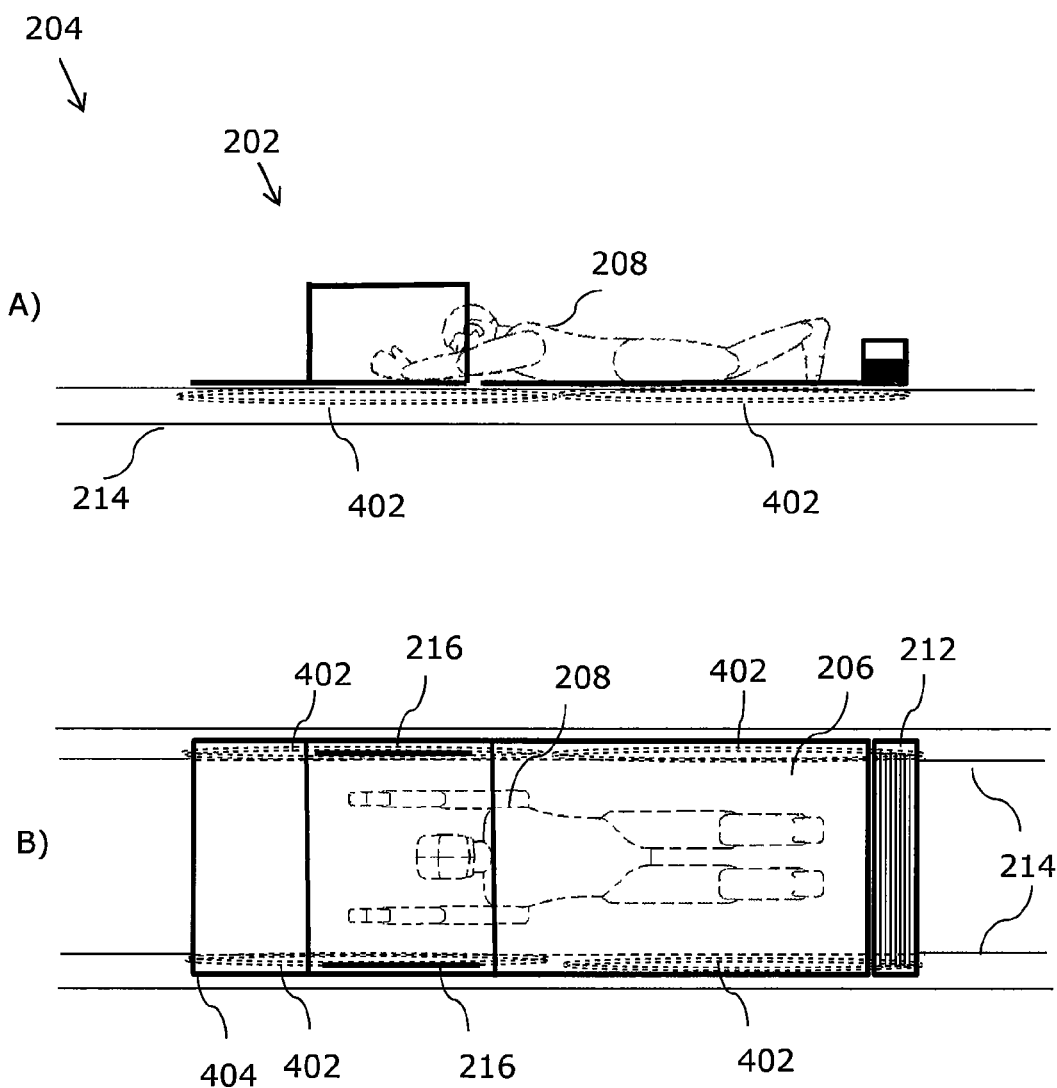
FIG. 4 is an illustration of an embodiment of the invention to be used in a material handling system adapted for transportation of items on driven belts or the like, the embodiment including a hatch.

FIG. 4 is an illustration of an embodiment of the invention to be used in a material handling system 204 adapted for transportation of items on driven belts 402 comprised in the track 214.

The device is illustrated as a single unit 404, comprising the bearing surface and one or more hatches 216, shown opened in FIG. 4. The embodiment is shown in a side view A) and a top view B). The figure illustrates a person with dashed lines in that the service person or operator may or may not be present on the device. In order to simplify the illustration, the user interface, service equipment etc is not shown in the figure.

The single unit device 404 shown is not 'incorporated or attached' to a material handling system but adapted for moving along the material handling system 204 using the driven belts 402 for providing movement comprised in the material handling system.

Figure 5:
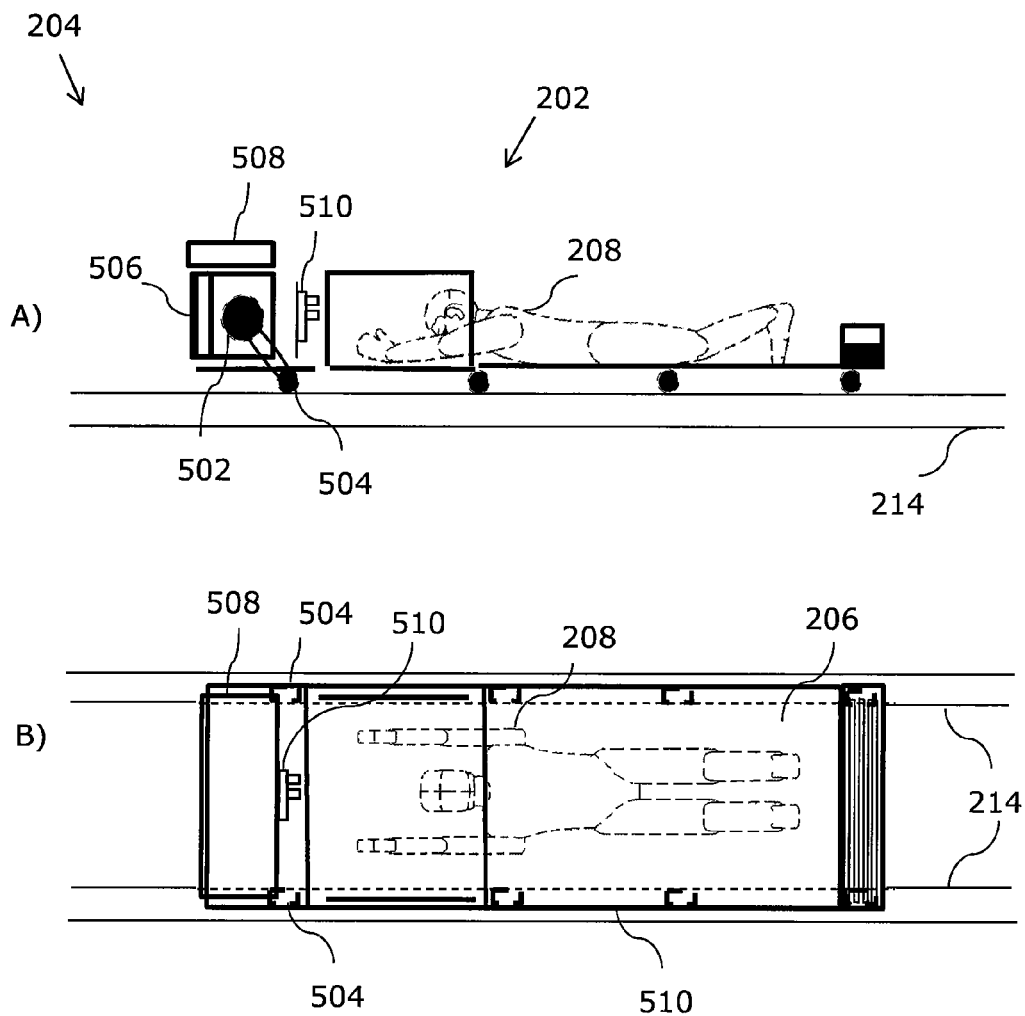
FIG. 5 is an illustration of an embodiment of the invention to be used in a material handling system adapted for transportation of items on driven belts or the like, where the device comprises on board means for providing movement of the device along a track of the material handling system, the embodiment including a hatch.

FIG. 5 is an illustration of an embodiment of the invention to be used in a material handling system adapted for transportation of items on driven belts or the like, where the device comprises means for providing movement of the device along a track of a material handling system on board. The means for providing the movement is illustrated as an electric motor 502 driving one or more driving wheels 504 using a power source 506 such as a battery or an inductive power transfer device. In order to simplify the illustration, e.g. the service equipment and the physical sides are not shown in the figure.

In the system illustrated in FIG. 5, access is gained via the hatch to parts of the material handling system, which parts are moving relatively to the device during movement of the device. This is due to that in this embodiment movement of the device, relatively to the material handling system, is provided by the device.

The device is controlled via a user interface 510 and an on board controller 508 which may be preferred for this embodiment of the device 202.

The embodiments illustrated in the FIGS. 2-5 are shown to be adapted with a length for encompassing a person lying in a service position on the bearing surface. Alternatively or additionally, the service device is adapted with a height for a sitting or kneeing service person. Such a device and configuration of the device is illustrated in FIG. 6 and described in the following.

Figure 6:
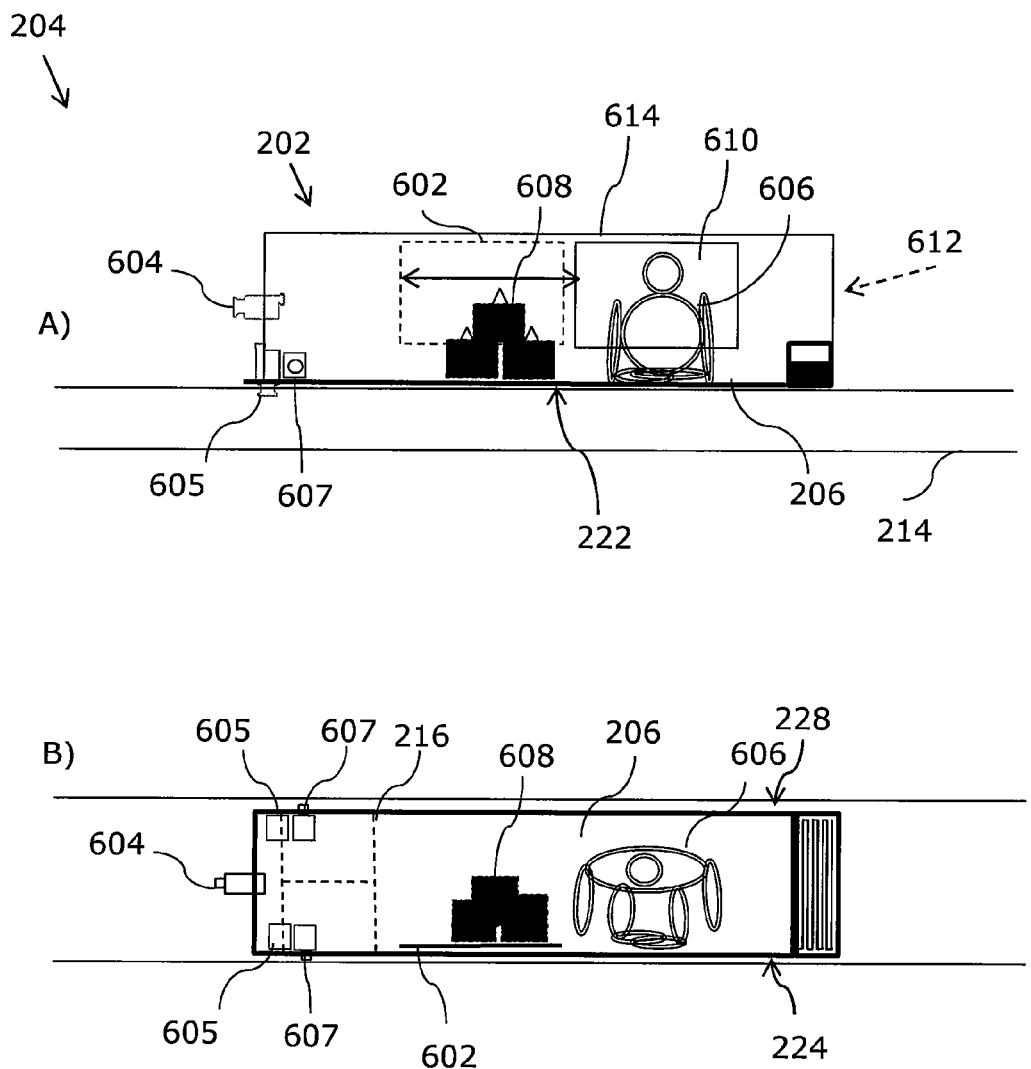
FIG. 6 is an illustration of an embodiment of the invention in a material handling system where the device comprises a hatch for servicing and/or inspection to a left or right side of the device when seen in a travelling direction of the device, the embodiment including a hatch.

FIG. 6 is an illustration of an embodiment of the invention in a material handling system where the device comprises a hatch for servicing and/or inspection to a left side 224 of the device when seen in a travelling direction of the device 202.

Furthermore the device illustrated in FIG. 6 includes two hatches 216 on a bottom side 222 of the device 202. The bottom side hatches are only illustrated in the top view B). The hatches 216 in the bottom side may be used to collect small items which have unintentionally entered the sorter track and/or for carrying out service and/or inspection.

The figure illustrates a sitting or kneeing operator 606 inside a transparent caging 614, which caging is having a safety exit in a rear end of the device 202 to which end the arrow 612 points. The device also includes a hatch opening 610 through which the operator may e.g. collect too slippery bags or items which have fallen off into nets (not shown) along the track of the material handling system. The hatch 602 of the device is illustrated as a sliding hatch.

The illustrated device furthermore includes a number of cameras, for detection of service tasks on or adjacent to the track of the material handling system. In the shown embodiment a front camera 604 is positioned for detection and imaging in a forward direction, two side cameras 607 are positioned and directed for obtaining pictures towards the left 224 and right 228 side of the device and two bottom view cameras 605 are positioned so as to provide detection and/or images towards the sorter track and preferably in the normally covered space of the track. Possibly two or more of the cameras may be combined as wide lens camera or only a single camera may be provided. A camera configuration as illustrated and described may also be comprised in any other of the embodiments of the device 202 herein.

Still further, one or more cameras may be used to detect presence of any bags 608 or parcels, such as very slippery bags or the like, which may have fallen into nets (not shown) along the material handling system or items which have even fallen into the track 214 of the material handling system 204, and which items is to be collected using the device 202 for this service task or not.

Figure 7:
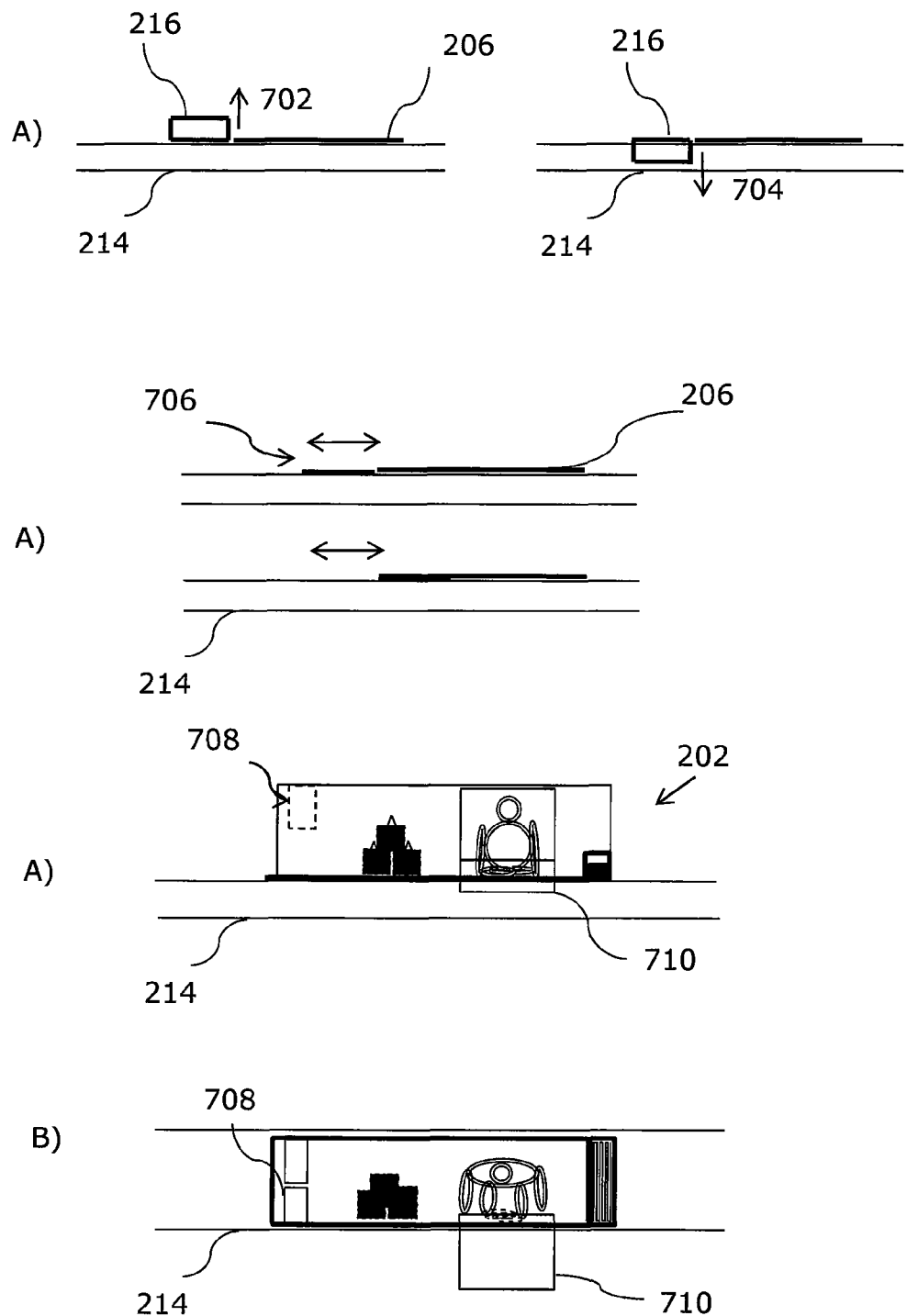
FIG. 7 is an illustration of various types of hatches.

FIG. 7 is an illustration of various types of hatches 216, 706, 708, 710. The service hatch 216, 706, 708, 710 is preferably transparent but may not be. Although the service hatch is illustrated as one or more hinged doors, the hatch may be provided as a door which can be moved manually or automatically by sliding the hatch between the first and the second position, such as illustrated in FIG. 6 or in this figure at 706. The movement of such sliding door or hatch is preferably in the moving direction of the device along the track 214 but may alternatively be in direction transverse to such direction. Such hatch 706 can also at least partially be used as bearing surface 206, when provided in its first closed position. Alternatively or additionally, a displaceable section, such as a rotating hatch or a rotating bearing surface, may be displaced by rotating the section so that a given predetermined part of the section is displaced between the first and the second position, relatively to a remaining part of the device. The predetermined part of the section may be an opening in the section or a surface for carrying a person.

Still further, although that preferred embodiments comprises that the service hatch opens inwards 702 in a direction towards any service person in or on the device 202, the service hatch may be provided so as to open towards the outside 704, in a direction away from a service person present on the device in a given service situation.

In an embodiment where at least one service hatch is provided in one end of the service device, such as when the service hatch is provided just in front of and/or just below a face of a laying service person, it may be preferred that the service hatch is mechanically prevented from being opened outwards 704, in that then the hatch is found to be provided with a increased safety to enable use as arm rest etc., compared to a service hatch or service door which is e.g. electronically prevented from being opened outwards.

Figure 8:
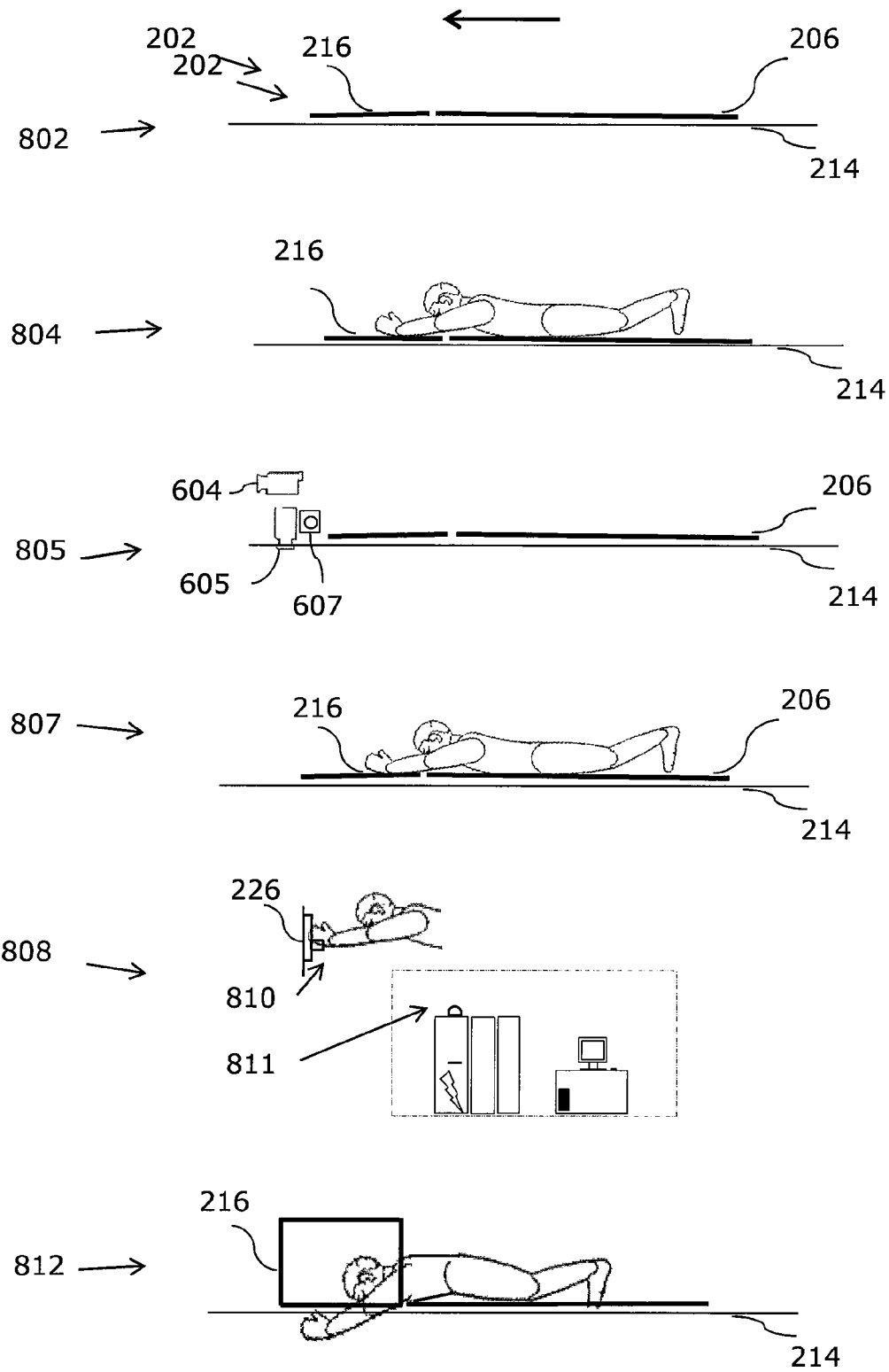
FIG. 8 is an illustration of a method aspect in accordance with embodiments of the invention.

FIG. 8 is an illustration of a method aspect of in accordance with embodiments of the invention.

In particular there is illustrated a method of servicing and/or providing inspection of a material handling system 102, 204, the method comprising enabling movement 802 of a device 202 comprising at least one section 216, 602, 706, 708, 710, 902, 1002 along a track 214 of the material handling system, servicing 804 and/or providing inspection 805, 807 of the material handling system or components thereof positioned on or adjacent to the track (214) from the device.

Furthermore the figure illustrates controlling operation of the device via a control system enabling control of the device, by inputting control signals to the control system in order to start or stop or adjust transportation speed or for initiating, stopping or controlling an automated servicing procedure as manually inputted requests 810 or as automatically generated requests 811 as automatically generated control signals and displacing said at least one section 216, 602, 706, 708, 710, 902, 1002 from a first to a second position on the device. The manual inputs can be requested by a person present on the device or may, e.g. in an unmanned situation of the device, be requested manually via a user interface positioned apart from the device, such as positioned at a person present on the ground just below the device.

The section in the first position is preventing a person on the device from manually accessing an area of the material handling system with parts of the material handling system which are moving relatively to the device during movement of the device or during operation of the material handling system, whereas the section positioned in the second position is enabling the person of accessing said parts, and carrying out manual service of the material handling system.

Servicing 812 and/or carrying out inspection 804, 812 of the material handling system can as illustrated by carried out through the hatch. Here, 'through the hatch' is as examples to be construed as; providing manual inspection through a transparent hatch in its closed first position, in order to determine which service may be carried out through an opened hatch in its second position, or as service carried out through an opening of an opened hatch in its second position, i.e. through a 'hatch hole'.

The automatically generated controls signals may be wirelessly sent from the central control system to the device or otherwise sent to the device, e.g. via wires to close range transmitters at the track 214 of the material handling system.

Alternatively or additionally, and in accordance with particular embodiments of the invention, an opening through which opening a service and/or inspection task is to be carried out is provided in a caging 904 or chassis 904 of the device 202.

Figure 9:
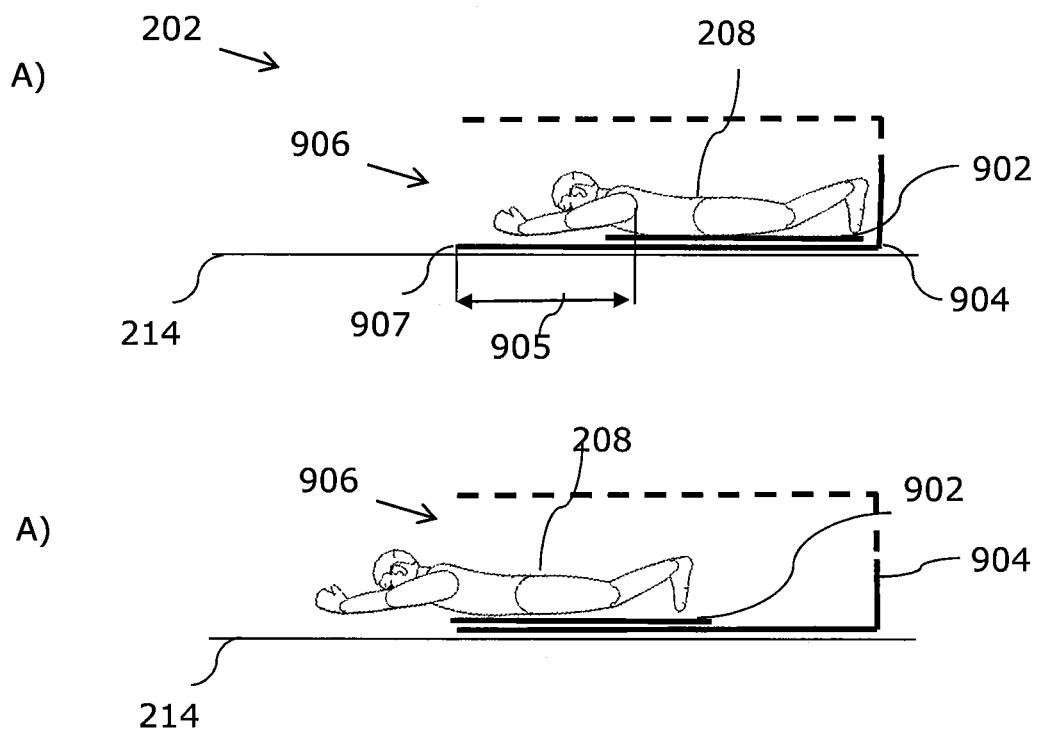
FIG. 9 is an illustration of an embodiment of the invention to be used in a material handling system, the embodiment including a sliding bearing surface.
Figure 10:
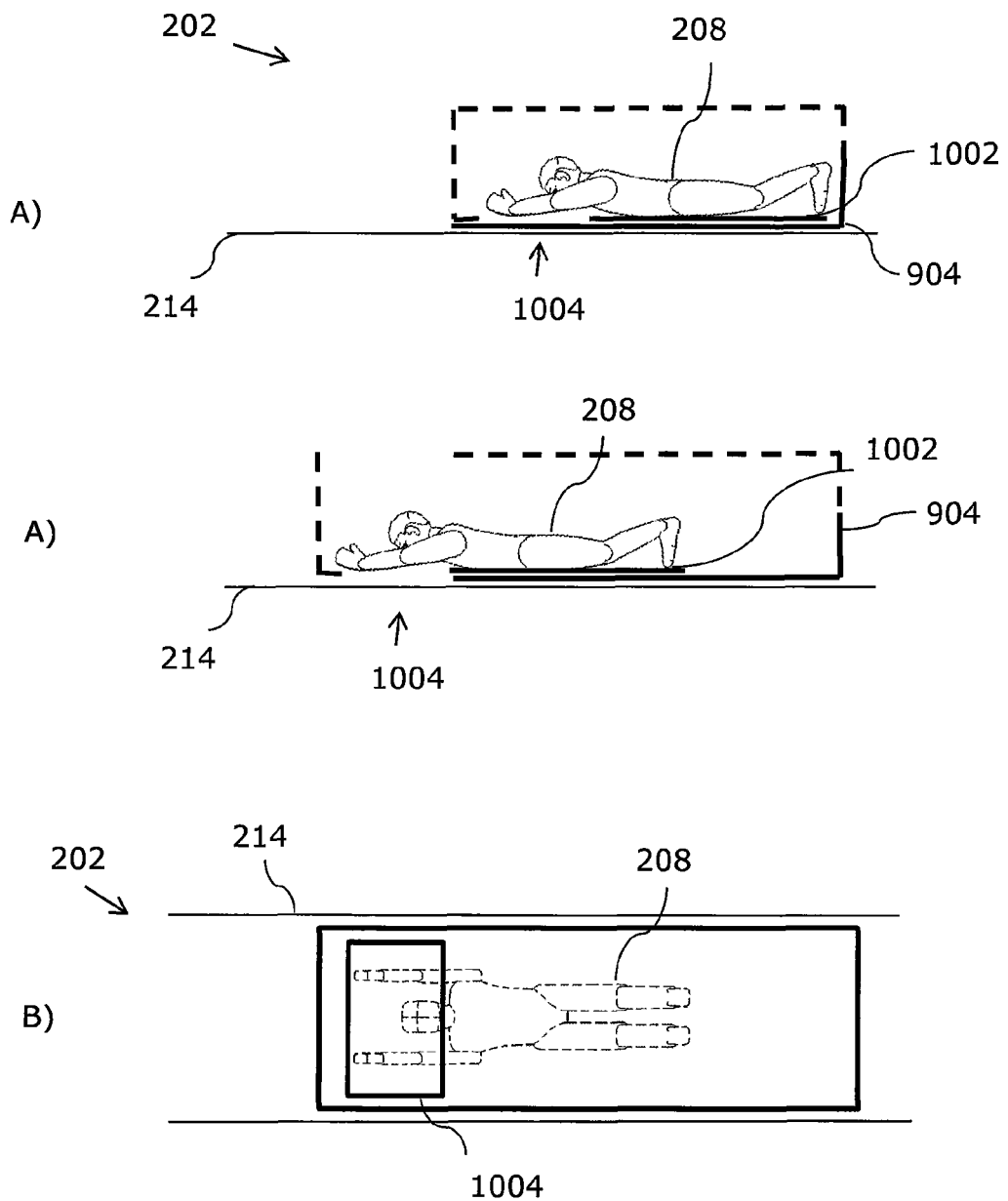
FIG. 10 is an illustration of an embodiment of the invention to be used in a material handling system, this embodiment also including a sliding bearing surface.

These embodiments are illustrated and described in FIGS. 9 and 10.

FIG. 9 illustrates an embodiment where the device 202 comprises at least one section which is displaceable between the first and the second position on the device. The displaceable section in this embodiment is the sliding bearing surface 902. The first position is shown in an uppermost side view (A) in FIG. 9, whereas the second position of the displaceable section, in this embodiment the sliding bearing surface, is illustrated in the side view (A), just below, in FIG. 9.

It is illustrated that the sliding bearing surface 902 is displaceable between the first and second positions so as to enable servicing of the material handling system from said sliding bearing surface when the sliding bearing surface is in the second position.

In the first position of the sliding bearing surface, a service person 208 carried by the sliding bearing surface, is positioned inside the caging 904 or on a bottom chassis with sides, in a certain distance 905, preferably at least 850 mm, from an edge 907 of the chassis with sides or from an opening 906 in the caging 904. This is provided in order for the service person carried by the bearing surface to be prevented from reaching an area of the material handling system with parts of the material handling system which are moving relatively to the device during operation of the material handling system.

In the second position of the sliding bearing surface, a service person 208 carried by the sliding bearing surface, has been moved towards the opening in the caging and thus to a second position of the sliding bearing surface, so as to enable the service person to reach an area of the material handling system with parts of the material handling system which are moving relatively to the device during operation of the material handling system, and thus to be able to carry out a manual service task, such as repair and/or cleaning.

In this embodiment it may be preferred that the service person is fixed to the sliding bearing surface 902. Hereby it is assured that the service person is not able to reach through the opening 906 in the caging 904 from the first position of the bearing surface, but only in the second position of the sliding bearing surface.

At least some parts of the caging 904 is in FIGS. 9 and 10 shown with dashed lines, in that it may be transparent or these parts may not be present.

FIG. 10 illustrates an embodiment of the device 202 in two top views (A) and one side view (B), in which a sliding bearing surface 1002 is provided with an opening 1004 which opening is made accessible when the sliding bearing surface is provided in the second position as illustrated in the side second side view (A) from the top of the page.

When the embodiments in FIGS. 9 and 10 are incorporated in a material handling system such as a cross belt or tilt tray sorter, it is preferred to dismantle at least one tilt tray or cross belt, including any top coverings, at the position of the opening 906 or 1004 in order to improve access to the track, and especially an inside of the track. This in order for the service person on the device to gain access to an area which is normally not accessible and with parts of the material handling system which are moving relatively to the device during operation of the material handling system from the device and while being in a service posture on the at least one section, in this example a sliding bearing surface 1002 with an opening 1004.

An advantage of the embodiments in FIGS. 9 and 10 may be seen to be that access may e.g. be improved towards a left and/or right side of the device when the device includes a sliding bearing surface 902, 1002 and when the sliding bearing surface is provided in its second position.

In short, a device 202 for servicing and/or inspection of a material handling system 204 is disclosed herein, which device provides safer, less time consuming and less difficult service and/or inspection of the material handling system 204 than other devices. The device 202 is adapted to be moved along a track 214 of the material handling system and adapted for servicing and/or inspection of the material handling system or components thereof positioned on or adjacent to the track 214. The device includes at least one section, such as a hatch and/or a sliding bearing surface 216, 602, 706, 708, 710, 902, 1002, displaceable between a first and a second position, where the section positioned in the second position is enabling a person of accessing parts of the material handling system which are moving relatively to the device during operation of the material handling system.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Reference signs are included in the claims, however the inclusion of the reference signs is only for clarity reasons and should not be construed as limiting the scope of the claims.

The invention claimed is:

1. A material handling system in a postal package hub, distribution center or airport, comprising i) a sorter track, roller or belt and ii) a device for servicing and/or inspection of the material handling system, wherein the device is adapted to be moved along the sorter track, roller or belt of the material handling system and adapted for servicing and/or inspection of the material handling system or components thereof positioned on or adjacent to the sorter track, roller or belt and adapted to be controlled via a user interface, and wherein the device comprises:

at least one displaceable section, which is displaceable between a first and a second position on the device, wherein said section in the first position prevents a person carried on the device from manually accessing an area of the material handling system with the sorter track, roller or belt of the material handling system which are moving relatively to the device during movement of the device or during operation of the material handling system, and wherein said section positioned in the second position enables the person to access the sorter track, roller or belt of the material handling system which are moving relatively to the device during movement of the device or during operation of the material handling system.

2. The material handling system according to claim 1, wherein the device comprises a means for enabling or disabling displacement of the at least one section and wherein the at least one section is only displaceable in response to one or more criteria being satisfied.

3. The material handling system according to claim 1, wherein the at least one section and the device is adapted with sizes and said section is adapted with first and second positions, so as to enable a person to be transported along the sorter track, roller or belt of the material handling system on the device while lying in a service posture on the device.

4. The material handling system according to claim 1, wherein the device comprises a connecting means for connecting safety equipment to the device for escaping from the device from an elevated height of the device.

5. The material handling system according to claim 1, wherein the user interface, comprises a user interface fixed in the device, for inputting control requests for controlling the device.

6. The material handling system according to claim 1, wherein the user interface comprises a handheld wireless user interface, which is to be positioned in the device, for inputting control requests for controlling the device.

7. The material handling system according to claim 1, wherein said section is provided as at least one hatch.

8. The material handling system according to claim 7, wherein said hatch is displaceable between said first and second positions so as to enable servicing and/or inspection of the material handling system through the hatch when the hatch is in the second position.

9. The material handling system according to claim 1, wherein said section is provided as at least one sliding bearing surface.

10. The material handling system according to claim 9, wherein said sliding bearing surface is displaceable between said first and second positions so as to enable servicing and/or inspection of the material handling system from said sliding bearing surface when the sliding bearing surface is in the second position.

11. The material handling system according to claim 1, wherein the device is operably coupled to a control system, which is operably coupled to a power means for providing power for transporting the device along the sorter track, roller or belt.

12. The material handling system according to claim 11, wherein the device further comprises a wireless transmission means and the device and the wireless transmission means are adapted for sending wireless control signals for starting or stopping or adjustment of transportation speed of the device from the device to the control system and thus for the power means to enable starting, stopping or adjustment of the transportation speed.

13. The material handling system according to claim 1, wherein the device is adapted for obtaining signals corresponding to a transportation speed of the device.

14. The material handling system according to claim 13, wherein a criterion for enabling said section to be displaced from the first to the second position is that a transportation speed of the device is zero or substantially zero.

15. The material handling system according to claim 1, wherein the device is comprised in a driving chain of the material handling system.

16. The material handling system according to claim 1, wherein the device is adapted for attachment to or incorporation in a driving chain of the material handling system.

17. The material handling system according to claim 1, wherein the device is adapted for transportation along the sorter track, roller or belt of the material handling system.

18. The material handling system according to claim 1, wherein the device further comprises a detection means for detection of service tasks on or adjacent to the sorter track, roller or belt of the material handling system.

19. A method of servicing and/or providing inspection of a material handling system in a postal package hub, distribution center or airport, the material handling system comprising a sorter track, roller or belt, and the method comprising:
    enabling movement of a device comprising at least one displaceable section along a sorter track, roller or belt of the material handling system,
    servicing and/or providing inspection of the material handling system or components thereof positioned on or adjacent to the sorter track, roller or belt from the device,
    controlling operation of the device via a control system enabling control of the device, wherein the method further comprises:
    inputting control signals to the control system in order to start, stop, adjust transportation speed or for initiating, stopping or controlling an automated servicing procedure as manually inputted requests or as automatically generated requests as automatically generated control signals,
    displacing said section from a first to a second position on the device, where said section in the first position is preventing a person on the device from manually accessing an area of the material handling system with the sorter track, roller or belt of the material handling system which are moving relatively to the device during movement of the device or during operation of the material handling system, and where said section positioned in the second position is enabling the person of accessing said the sorter track, roller or belt, and
    carrying out manual service of the material handling system when said section is positioned in said second position.

20. The method according to claim 19, wherein the automatically generated control signals are provided in response to detections provided by one or more detection systems provided on board the device.

21. The method according to claim 19, wherein the person to be transported by the device is provided for carrying out manual service and/or for inputting control requests and/or for carrying out inspection of the material handling system.

22. The method according to claim 19, further comprising:
    stopping the transportation of the service device at a location along the sorter track, roller or belt, and
    carrying out a manual or automated service procedure or inspection at or adjacent to said location.

23. The method according to claim 19, wherein said section can only be displaced from the first to the second position when a transportation speed of the device is zero or substantially zero.

24. The method according to claim 19, further comprising maintaining a posture of the person on the device, while the device is moved along the sorter track, roller or belt of the material handling system to a new location of the material handling system, which requires service and/or inspection and while carrying out service and/or while carrying out inspection.

25. The method according to claim 19, further comprising stopping the device at one or more predetermined locations along the sorter track, roller or belt, which one or more locations may be set manually or automatically.

26. The method according to claim 19, wherein said manual service is carried out through an opening, which is provided when displacing said section to the second position.

27. The method according to claim 19, wherein said manual service is carried out through an opening, which is made accessible when displacing said section to the second position.

28. A material handling system in a postal package hub, distribution center or airport, comprising i) a sorter track, roller or belt, ii) a device for servicing and/or inspection of the material handling system, and iii) a lock or a brake, wherein the device is adapted to be moved along the sorter track, roller or belt of the material handling system and adapted for servicing and/or inspection of the material handling system or components thereof positioned on or adjacent to the sorter track, roller or belt and adapted to be controlled via a user interface, and wherein the device comprises:

at least one displaceable section, which is displaceable between a first and a second position on the device, wherein said section in the first position prevents a person carried on the device from manually accessing an area of the material handling system with the sorter track, roller or belt of the material handling system which are moving relatively to the device during movement of the device or during operation of the material handling system, wherein said section positioned in the second position enables the person to access the sorter track, roller or belt of the material handling system which are moving relatively to the device during movement of the device or during operation of the material handling system, and wherein the lock or brake is configured to enable the displaceable section to be positioned only in, or be displaced to, the second position when a transportation speed of the device for servicing and/or inspection of the material handling system is zero or substantially zero.

* * * * *